UNITED STATES PATENT OFFICE.

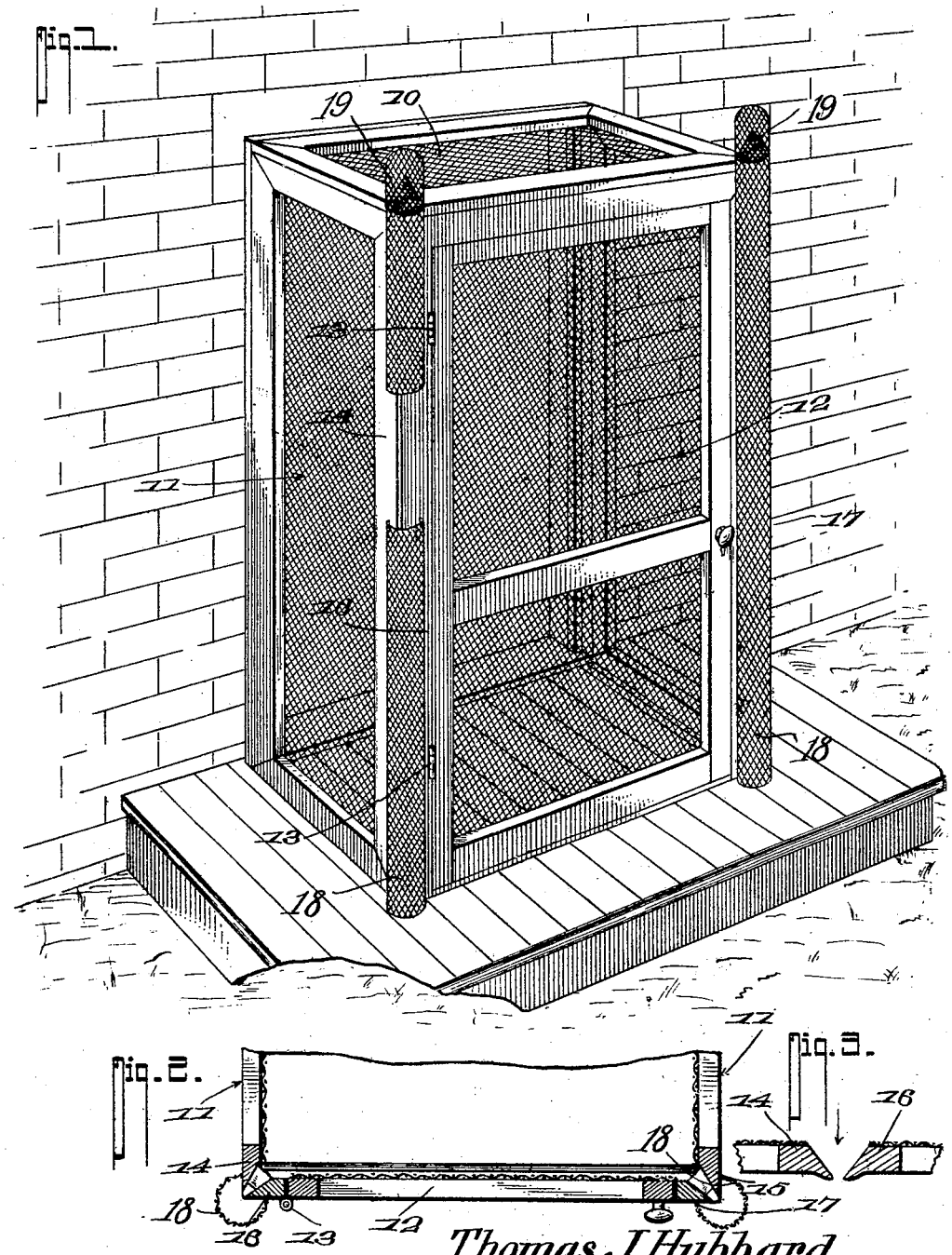

THOMAS J. HUBBARD AND WILLIAM W. HUBBARD, OF ABINGDON, ILLINOIS.

INSECT-SCREEN DEVICE.

No. 859,385.     Specification of Letters Patent.     Patented July 9, 1907.

Application filed October 15, 1906. Serial No. 339,014.

*To all whom it may concern:*

Be it known that we, THOMAS J. HUBBARD and WILLIAM W. HUBBARD, citizens of the United States, residing at Abingdon, in the county of Knox and State of Illinois, have invented a new and useful Insect-Screen Device, of which the following is a specification.

This invention relates to insect screen devices for disposition over doorway openings and has for its object to produce a simple construction of the character indicated whereby flies and other insects are prevented from getting into the house and which is also so constructed as to afford a convenient means of egress from the house into the traps hereinafter described.

Insects of the character named are ever desirous of being out of doors during the warmer part of the day and by taking advantage of such desire the present construction is such as to lead the insects into traps. As bad weather, storm or evening approaches the insects seek entrance within and many do enter as doors are necessarily open. Therefore, in order to reduce such entry to a minimum side and top screens are located about the door and upon such screens the insects light leaving the screen door comparatively free.

In the accompanying drawing:—Figure 1 is a perspective view of the improved device applied. Fig. 2 is a transverse section of the outer portion of the same. Fig. 3 is a sectional detail illustrating a modification in the construction.

It is well known that flies and other insects seek the warmest portions of the room or where warm currents of air are passing, and likewise seek the lighter portions of the room, and in the warmer part of the day will seek to pass from the room and gather upon the screens where the warm currents of air are passing outwardly, and one of the principal objects of the invention herein shown and described is to provide a ready means for the escape of the insects which thus gather upon the screen, while at the same time means is provided for trapping the same.

In the preferred form of the application of the invention, the screen frames are arranged as a vestibule like structure over the doorway opening as shown in Fig. 1 with the top 10, spaced sides 11, and front 12 of screen covered frames, the front being in the form of a door hinged as at 13 for swinging outwardly. The outer side members 14, 15 and the contiguous outer members 16—17 of the front 12 are reversely inclined and disposed with the outer relatively sharp edges relatively close together, or spaced just far enough apart to permit a fly to pass. By this means V-shaped recesses are formed longitudinally of the structure at the corners and diverging inwardly and with contracted outlets.

The screen material will preferably be placed upon the inner faces of the frames as shown, so that the insects will meet no abrupt obstructions in passing into the V-shaped recesses. By this arrangement the currents of warm air in passing outwardly encourage the insects to endeavor to pass outward with the currents and will readily follow along the screen in the effort to do so, and so naturally pass into the V-shaped discharge apertures and thence through the contracted discharge outlets, but will not be liable to pass inwardly through the contracted sharp edged outer side, as will be obvious.

In Fig. 3 is shown a sectional detail view of the contiguous edges of a pair of screens arranged in longitudinal alinement instead of at right angles as in Figs. 1 and 2, illustrating the slight modification necessary to adapt the improved device to screen frames thus arranged, but this would not be a departure from the principle of the invention, as the same results would be produced and in the same manner. The vertically extending conductors 18, are arranged over the spaces between the members 14—15 and at their upper ends the removable fly traps 19 are located. Thus the flies that pass through the spaces between the members 14 and 15 follow the conductors 18 and enter the traps 19. When the said traps are filled they are taken down and the insects are destroyed.

Having thus described the invention, what is claimed is:—

An insect screen comprising frames having their adjacent edges spaced apart and oppositely-inclined to form a constricted egress, a screen conductor attached to the frames and surrounding the egress, and a fly trap combined with one end of the conductor.

In testimony that we claim the foregoing as our own, we have hereto affixed our signatures in the presence of two witnesses.

THOMAS J. HUBBARD.
                       WILLIAM W. HUBBARD.

Witnesses:
   J. H. SIMMONS,
   G. K. SLOUGH.